United States Patent [19]
Cooley et al.

[11] Patent Number: 5,785,912
[45] Date of Patent: Jul. 28, 1998

[54] METHOD FOR THE FABRICATION OF AN ELECTROCHEMICAL CELL HAVING LONG TERM CHEMICAL STABILITY

[75] Inventors: Graham Edward Cooley, Oxon; Kevin John Nix, Wiltshire, both of United Kingdom

[73] Assignee: National Power PLC, Wiltshire, United Kingdom

[21] Appl. No.: 718,519

[22] PCT Filed: Mar. 24, 1995

[86] PCT No.: PCT/GB95/00667

§ 371 Date: Dec. 3, 1996

§ 102(e) Date: Dec. 3, 1996

[87] PCT Pub. No.: WO95/27751

PCT Pub. Date: Oct. 19, 1995

[30] Foreign Application Priority Data

Apr. 8, 1994 [GB] United Kingdom ............... 9407048

[51] Int. Cl.$^6$ ................... B29C 71/00; H01M 2/00
[52] U.S. Cl. ................................. 264/83; 429/176
[58] Field of Search ................ 264/83, 331.14, 264/331.17; 429/163, 176

[56] References Cited

U.S. PATENT DOCUMENTS

| | | |
|---|---|---|
| 2,811,468 | 10/1957 | Joffre ........................... 117/95 |
| 4,142,032 | 2/1979 | D'Angelo ........................ 526/43 |
| 4,454,208 | 6/1984 | Osmialowski ................... 429/163 |
| 4,485,154 | 11/1984 | Remick et al. ................... 429/14 |
| 4,617,077 | 10/1986 | Giese et al. ...................... 264/83 |
| 4,752,540 | 6/1988 | Chuna et al. .................... 429/176 |
| 4,869,859 | 9/1989 | Eschwey et al. ................. 264/83 |
| 5,401,451 | 3/1995 | Meixner et al. ................. 264/83 |

OTHER PUBLICATIONS

Encyclopedia of Polymer Science & Engeineering, "Chemically Resistant Polymers", John Wiley & Sons, vol. 3, pg. 425, 1985.

*Primary Examiner*—Jan H. Silbaugh
*Assistant Examiner*—Mark Eashoo
*Attorney, Agent, or Firm*—Antonelli, Terry, Stout & Kraus, LLP

[57] ABSTRACT

A method for the fabrication of an electrochemical cell which has long term chemical stability to anolyte and catholyte solutions at pH's of less than 2 and above 12, which method comprises the steps of: i) thermally processing a polymeric material which exhibits a glass transition to form the cell structure or components of the cell structure, and ii) subjecting the surfaces of the cell structure or components of the cell structure, which in use, will be in contact with the anolyte and catholyte solutions, to a post halogenation process, whereby the polymeric material forming the said surfaces undergoes halogen substitution to form a chemically stable halogen modified polymeric material.

11 Claims, 5 Drawing Sheets

METHOD FOR THE FABRICATION OF AN ELECTROCHEMICAL CELL HAVING LONG TERM CHEMICAL STABILITY

The present invention relates to a method for the fabrication of an electrochemical cell and in particular, to a method for the fabrication of an electrochemical cell which has long term chemical resistance and stability to anolyte and catholyte solutions having pH's of less than 1 and/or above 12 at temperatures from ambient to 60° C. and which can be formed from thermally processable materials by conventional techniques.

U.S. Pat. No. 4,485,154 discloses an electrically rechargeable anionically active reduction-oxidation electric energy storage-supply system using a sulfide/polysulfide reaction in one half of the cell and an iodine/polyiodide, chlorine/chloride or bromine/bromide reaction in the other half of the cell. The specification suggests that the cell may be operated with the anolyte and catholyte being maintained at slightly basic but near neutral pH's. We have found that when operating the system with a bromine/bromide couple, very low pH's are encountered on the bromine side of the cell and very high pH's on the sulfur side of the cell.

Polytetrafluoroethylene (PTFE) is highly resistant to the action of chemicals including strong acids and strong alkalis. However, it is not a thermally processable material.

Polyvinylidene fluoride (PVDF) is a thermoplastic fluorocarbon polymer which can be processed by conventional techniques such as compression moulding, injection moulding, extrusion, vacuum forming, rolling and welding. Whilst PVDF is fairly resistant to strong acids it is not stable in strong alkalis.

We have now developed a method for the fabrication of an electrochemical cell having chemical resistance and long term stability at both high and low pH's from a thermally processable polymeric material.

Accordingly, the present invention provides a method for the fabrication of an electrochemical cell which has long term chemical stability to anolyte and catholyte solutions at pH's of less than 2, preferably less than 1, and above 12, which method comprises the steps of:

i) thermally processing a polymeric material which exhibits a glass transition and/or melting thermal transition to form the cell structure or components of the cell structure, and ii) subjecting the surfaces of the cell structure or components of the cell structure which, in use, will be in contact with the anolyte and catholyte solutions, to a post halogenation process, whereby the polymeric material forming the said surfaces undergoes halogen substitution to form a chemically stable halogen modified polymeric material.

The polymeric material which is used in step (i) of the present invention may be any material which (a) is thermally processable and exhibits a glass transition and/or melting thermal transition. The polymeric material preferably has a Newtonian melt viscosity at 150° C. and 400 Pascals of less than 1000 Pascal seconds, more preferably less than 600 Pascal seconds, and (b) when halogenated forms a chemically stable modified polymeric material at its surface. Examples of suitable polymers are high or low density polyethylene, polypropylene or ethylene-propylene copolymers.

The polymeric material may be made into the desired cell structure or components of the cell structure by any of the well known techniques, such as machining of preformed sheets or plates, injection moulding, transfer moulding or compression moulding.

The halogenation process is preferably a fluorination process, although bromination or chlorination processes may also be used. The fluorination is preferably effected by exposing the surfaces which, in use, will be in contact with the anolyte and catholyte solutions to fluorine gas. The treatment with fluorine gas will preferably be carried out by contacting the surfaces with fluorine gas at a temperature of below 50° C. A fluorination process for the production of fluorinated polyethylene film and fluorinated polyethylene containers is disclosed in U.S. Pat. No. 2,811,468 and a similar process may be used in the present invention.

The fluorination may be carried out using an atmosphere containing 100% fluorine, or the fluorine may be diluted with an inert gas such as nitrogen.

When the halogenation process is a bromination process, this may be effected by exposing the surfaces to a solution containing bromine. For example, if the cell is to be used as an electrochemical cell in which one half of the cell uses a bromine/bromide reaction, the surfaces of the cell may effectively be treated by exposing them to the bromine containing solution before the cell is brought into operation.

It will be understood that those parts only of the cell structure which, in use, will be in contact with the anolyte or catholyte need to be subjected to the halogenation process. Thus, if a complicated cell structure is being fabricated it is possible to post halogenate the cell structure in sections, ensuring that any areas of the structures which are required to be joined together or to any other elements of the cell to form the final cell structure are not subjected to the halogenation process. For example certain areas of the cell structure such as the edges thereof may be masked during the halogenation process. Alternatively, certain areas of the cell structure such as the edges thereof may have upstands or sacrificial beads formed thereon which can be machined off to leave exposed non-halogenated surfaces which can be readily joined to other non-halogenated surfaces by welding or the like. Components of the cell structure may thus be joined in this manner to other elements of the cell such as the cell electrodes or cell membrane(s).

Alternatively or in addition any elements of the cell structure which would be sensitive to halogenation may be masked prior to the halogenation and the masking removed after the halogenation. For example, the electrodes may be incorporated into appropriate sections of the cell structure prior to the halogenation and masked during the halogenation process. The electrodes will then not be affected by the halogenation process and the sections of the cell structure can then be joined together, or to other elements of the cell, once the masking is removed.

The present invention also includes within its scope an electrochemical cell which has been prepared according to the method of the invention in which the surfaces of the cell structure which, in use, will be in contact with the anolyte and catholyte solutions have been subjected to a post halogenation treatment to form a chemically stable halogen modified polymeric material.

The present invention will be further described with reference to the following Examples:

EXAMPLE 1

One millimetre thick pieces of high density polyethylene, fluorinated high density polyethylene, high density polyethylene filled with titanium dioxide and fluorinated high density polyethylene filled with titanium dioxide were immersed in a solution of 1.5M $Br_2$/3M NaBr and the percentage changes in mass and dimensions with time were measured.

Figure 1:
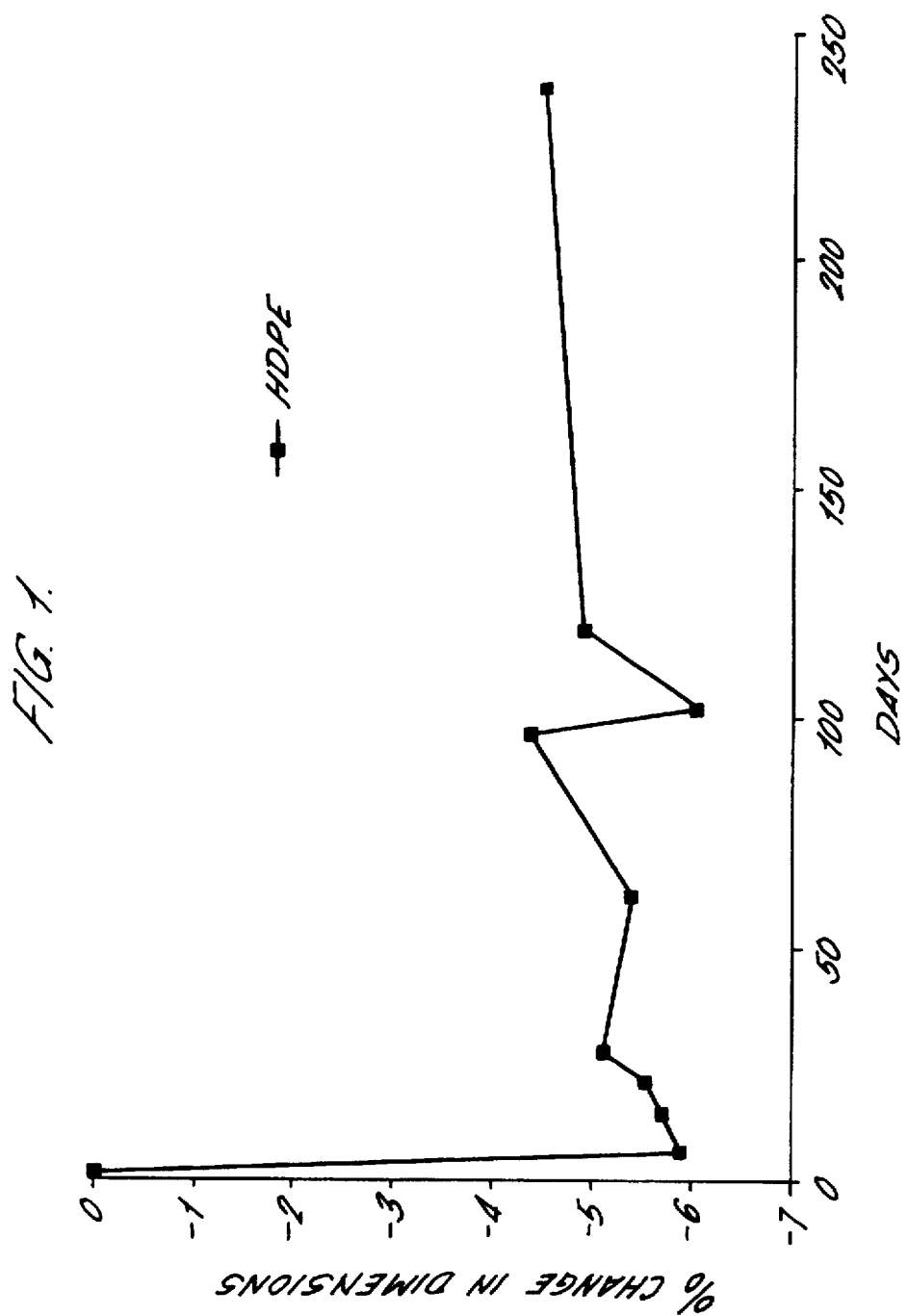
FIG. 1 shows the dimensional change over time for an unfluorinated high density polyethylene in a $Br_2$/NaBr solution.
Figure 2:
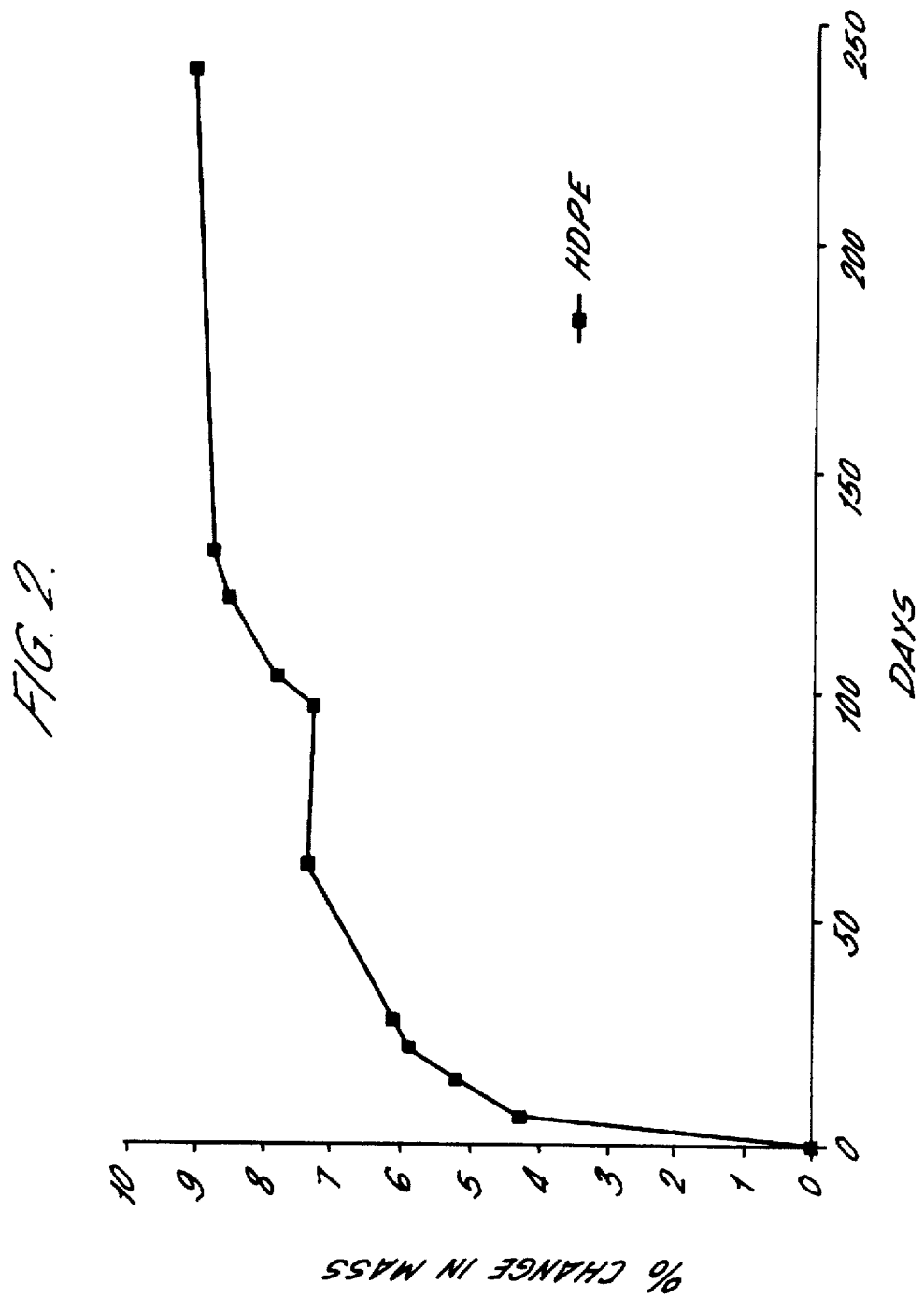
FIG. 2 shows the change in mass over time for an unfluorinated high density polyethylene in a $Br_2$/NaBr solution.
Figure 3:
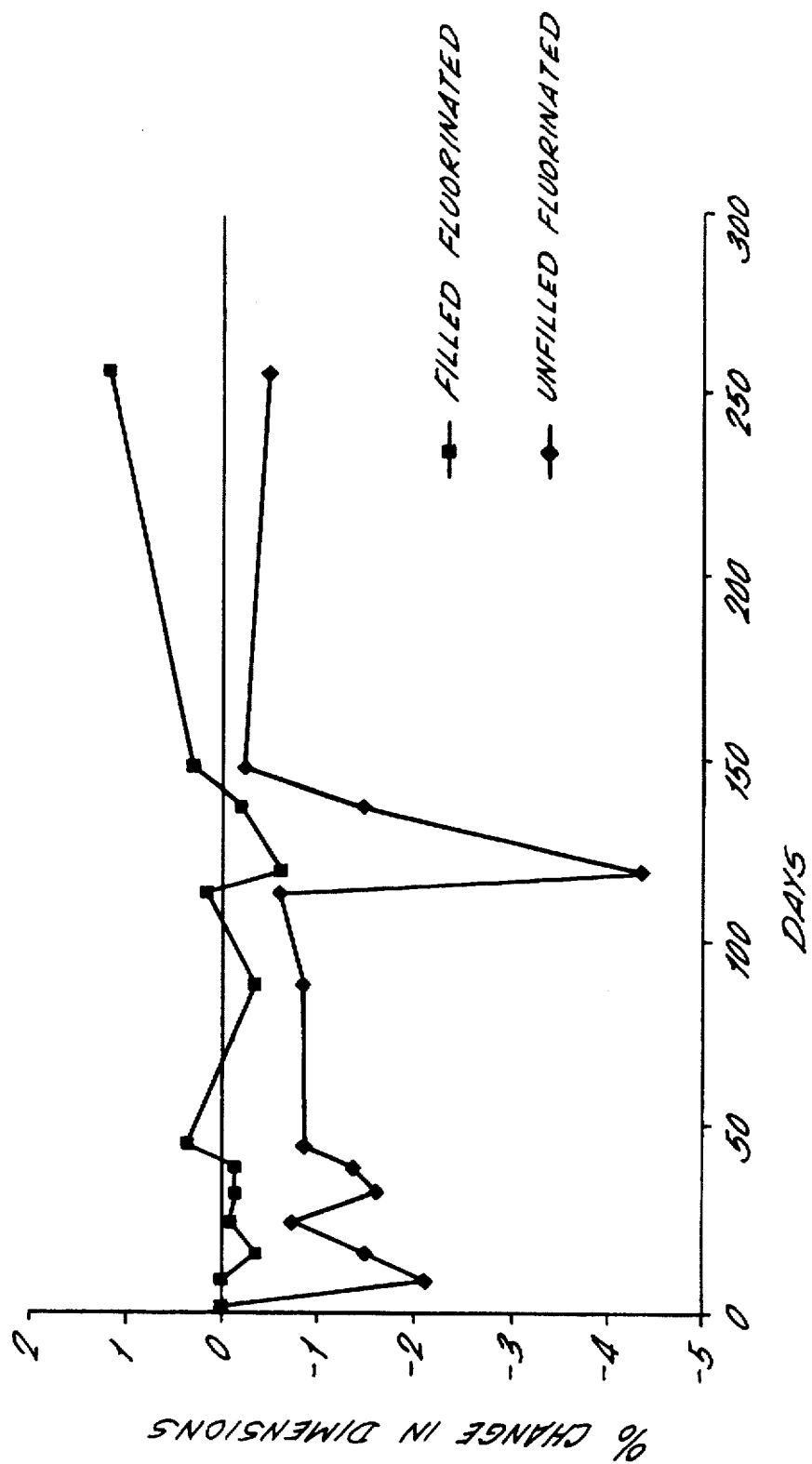
FIG. 3 shows the dimensional change over time for both filled and unfilled fluorinated high density polyethylene in a $Br_2$/NaBr solution.
Figure 4:
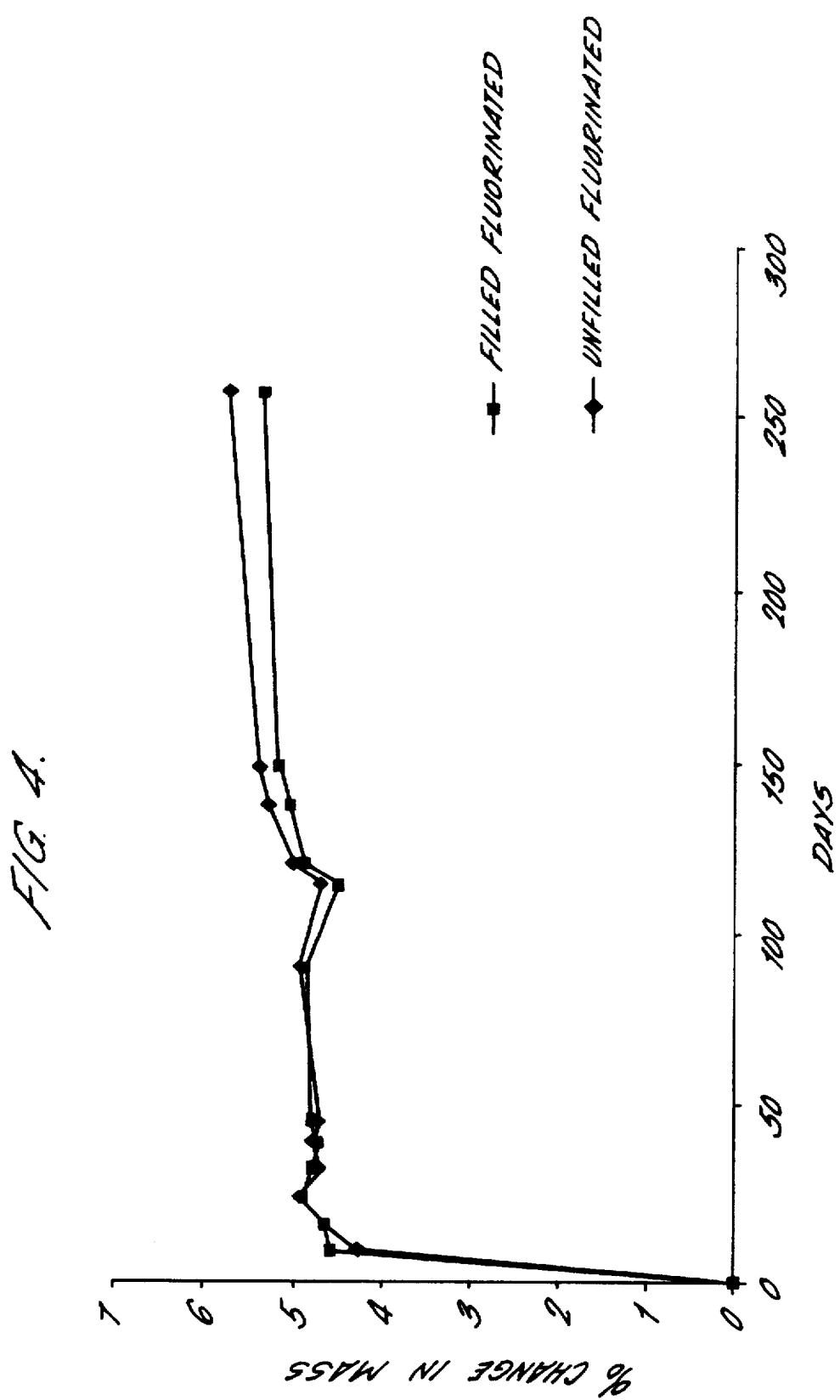
FIG. 4 shows the change in mass over time for both filled and unfilled fluorinated high density polyethylene in a $Br_2/NaBr$ solution.

The results are given in FIGS. 1 to 4. FIGS. 1 and 2 illustrate the percentage changes in dimension and mass, respectively, for an unfluorinated high density polyethylene. It will be noted from these Figures that initially the polyethylene changed significantly in dimensions and mass as the surface of the polyethylene was brominated by the bromine containing solution. Thereafter the high density polyethylene became relatively stabilized in the solution. FIGS. 3 and 4 illustrate the percentage changes in dimension and mass, respectively, for both the filled fluorinated and unfilled fluorinated high density polyethylene samples. FIG. 4, in particular, illustrates that both the filled fluorinated and unfilled fluorinated high density polyethylene samples are stable in the $Br_2/NaBr$ solution after an initial change in mass on immersion in the solution.

EXAMPLE 2

The permeability to bromine of high density polyethylene (HDPE) with and without a surface fluorine treatment was studied using a method which is a variation of the ASTM test method D2684.

Polyethylene containers of 250 ml capacity were each partially filled with 200 ml of an aqueous solution of 1.5M bromine in 4M sodium bromide and the containers sealed with fluoroelastomer stoppers. The containers were then each immersed in a glass jar containing 100 ml of a 0.1M aqueous solution of sodium hydroxide which was also sealed. Throughout each test the vessels were maintained at either 21° C. or 580° C. by immersion in a thermostatically controlled water bath. At intervals the sodium hydroxide solutions were replaced and the amount of bromine which had escaped from within each container and which had been trapped by the sodium hydroxide solutions was determined using ion chromatography.

This method allowed a direct comparison to be made of bromine escape from containers which were identical, except for the surface fluorination treatment.

Figure 5:
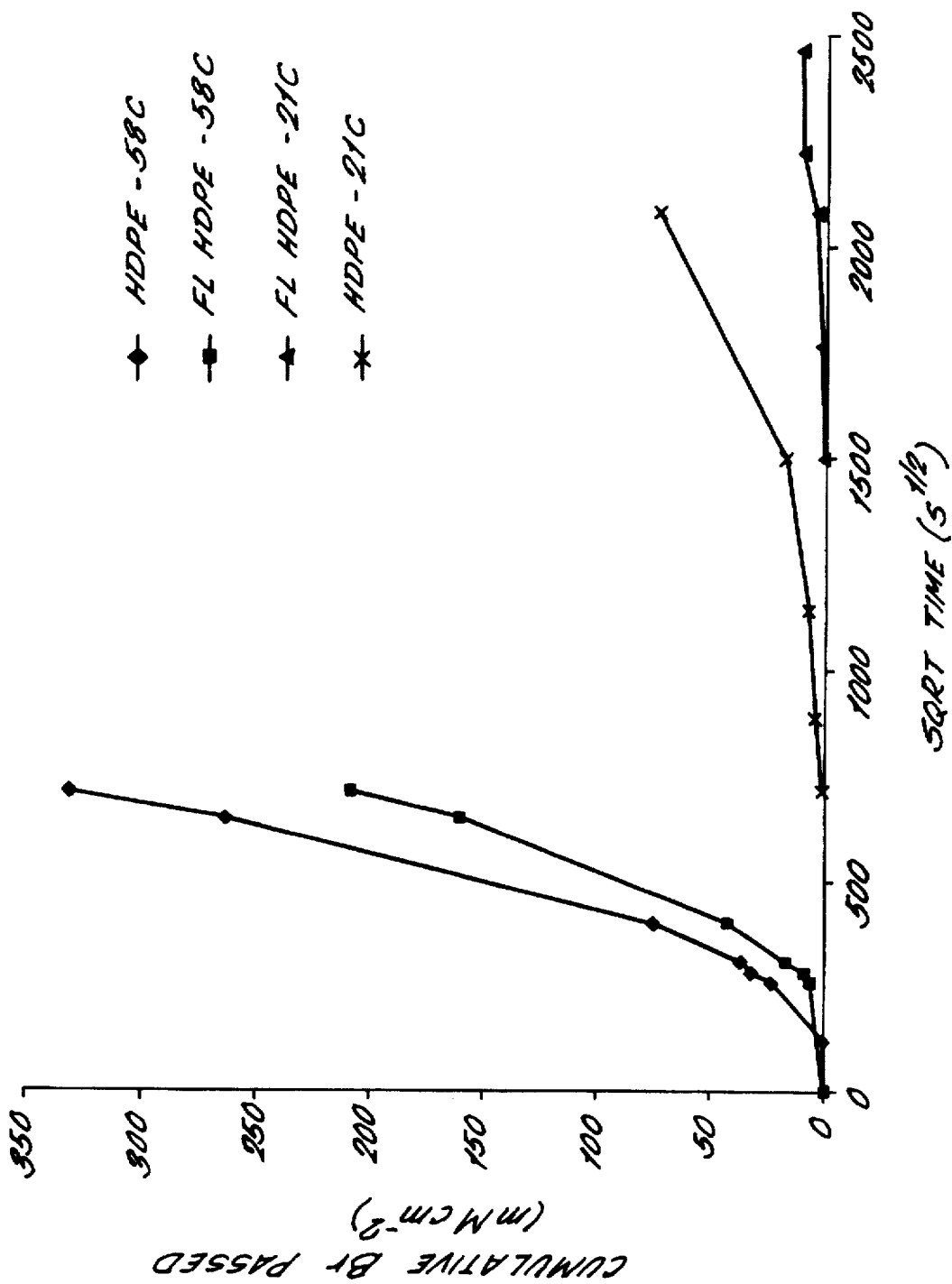
FIG. 5 shows the permeability of $Br_2$ in high density polyethylene and fluorinated high density polyethylene at 58° C. and 21 ° C.

The results are shown in FIG. 5 from which it can be seen that the escape of bromine from the untreated HDPE containers began almost immediately and proceeded fairly rapidly, whilst for the fluorinated FL-HDPE containers the escape or bromine was significantly delayed and then proceeded only very slowly.

EXAMPLE 3

A cell according to the present invention was constructed according to the following method.

Plates of high density polyethylene were machined in order to provide in the surface or surfaces of each plate the desired profiles to give desired cell design. Thus, the plates were machined to provide flow distributors for the electrolytes, flow distribution channels and appropriate holes for the electrodes. The electrodes where then welded into holes provided in the machined plates, masked and the plates subjected to a fluorination treatment using fluorine gas mixed with nitrogen in accordance with the teaching of U.S. Pat. No. 2811468.

The masking was then removed from the electrodes. The fluorinated plates were then separated one from another with cation exchange membranes and a plurality of the plates separated by the membranes were bolted together to form a multi-compartment cell.

We claim:

1. A method of fabricating an electrochemical cell which has long term chemical stability to anolyte and catholyte solutions at pH's of less than 2 and above 12, which method comprises the steps of:

i) thermally processing a polymeric material which exhibits a glass transition and/or a melting thermal transition to form a cell structure or components of the cell structure, and ii) subjecting surfaces of the cell structure or components of the cell structure which, in use, will be in contact with the anolyte and catholyte solutions, to a post halogenation process, whereby the polymeric material forming the surfaces undergoes halogen substitution to form a chemically stable halogen modified polymeric material.

2. A method as claimed in claim 1 wherein the polymeric material has a Newtonian melt viscosity at 150° C. and 400 Pascals of less than 1000 Pascal seconds.

3. A method as claimed in claim 1 wherein the polymeric material is high or low density polyethylene, polypropylene or an ethylene-propylene copolymer.

4. A method as claimed in claim 1 wherein the cell structure or components of the cell structure are formed by machining of preformed sheets or plates, injection moulding, transfer moulding or compression moulding.

5. A method as claimed in claim 1 wherein the post halogenation process is a fluorination process.

6. A method as claimed in claim 5 wherein the fluorination process is effected by exposing the surfaces which, in use, will be in contact with the anolyte and catholyte solutions, to fluorine gas.

7. A method as claimed in claim 6, wherein exposing the surfaces to fluorine gas is carried out at a temperature of below 50° C.

8. A method as claimed in claim 1 wherein the post halogenation process is a bromination process.

9. A method as claimed in claim 8 wherein the bromination process is carried out by exposing the surfaces which, in use, will be in contact with the anolyte solution to a bromine containing solution.

10. A method as claimed in claim 9 wherein an anolyte compartment of the cell is intended for use in a bromine/bromide reaction and the surfaces of the cell are exposed to a solution containing bromine before the cell is brought into operation.

11. An electrochemical cell which has been fabricated by a method as claimed in claim 1.

* * * * *